United States Patent [19]

Kershaw et al.

[11] 3,923,337
[45] Dec. 2, 1975

[54] MODULAR TRUCK BODY AND METHOD FOR MAKING THE SAME

[75] Inventors: Samuel L. Kershaw; Bernard E. Proeschl, both of Decatur, Ill.

[73] Assignee: Caterpillar Tractor Co., Peoria, Ill.

[22] Filed: May 23, 1974

[21] Appl. No.: 472,709

[52] U.S. Cl. ............................. 296/28 M; 52/584
[51] Int. Cl.² ............................... B62D 27/00
[58] Field of Search ...... 296/28 M, 28 K, 36, 28 D; 298/9, 10, 17 R; 52/584, 582, 279

[56] References Cited
UNITED STATES PATENTS

| | | | |
|---|---|---|---|
| 2,000,847 | 5/1935 | Kehm | 52/584 |
| 2,268,636 | 1/1942 | Becker | 52/582 |
| 2,489,670 | 11/1949 | Powell | 296/28 M |
| 2,600,140 | 6/1952 | Torseth | 296/28 M |
| 3,188,131 | 6/1965 | Attwood | 296/28 M |
| 3,462,187 | 8/1969 | Hassler | 296/28 D |
| 3,762,113 | 10/1973 | O'Mullan et al. | 52/582 |

*Primary Examiner*—Robert J. Spar
*Assistant Examiner*—Gary Auton
*Attorney, Agent, or Firm*—Phillips, Moore, Weissenberger Lempio & Strabala

[57] ABSTRACT

A modular truck body comprises a pair of upstanding side modules each having an L-shaped cross section, a bottom module having its outer edges secured to inner edges of the side modules and an upstanding front module secured between the side modules and having its lower edge secured to the bottom module. The modules are aligned and pre-assembled at a manufacturing plant and then disassembled for shipping purposes. At a customer's job site or the like the modules are re-assembled and secured together for installation on the frame of a truck.

7 Claims, 7 Drawing Figures

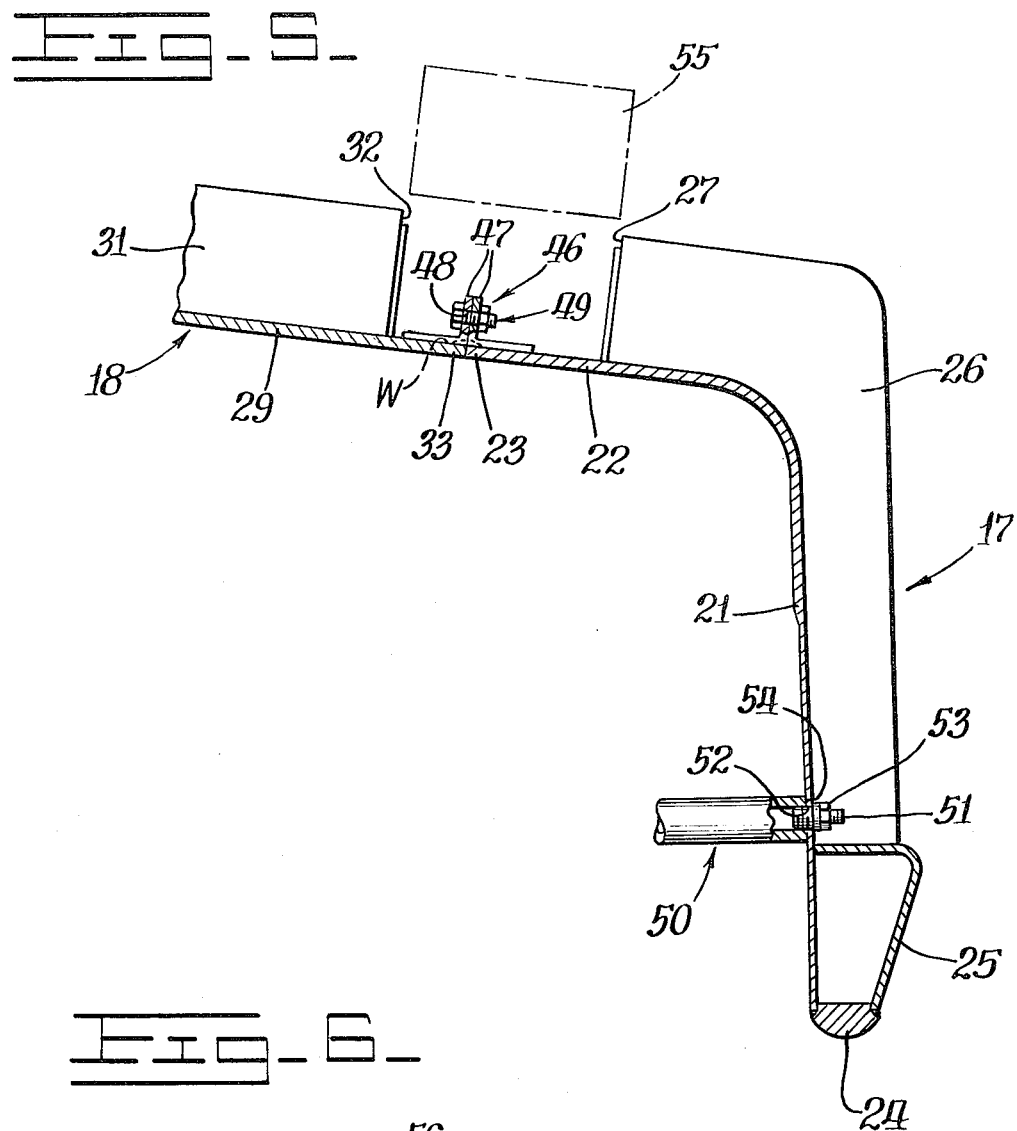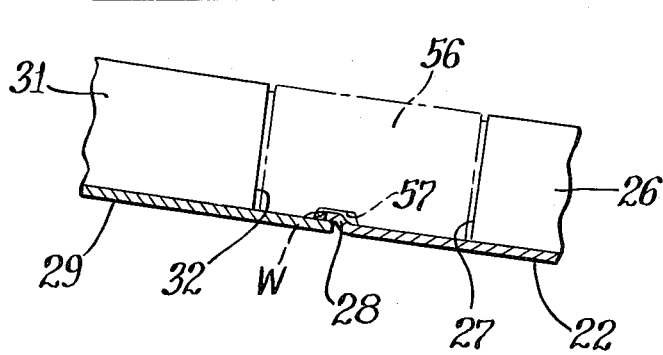

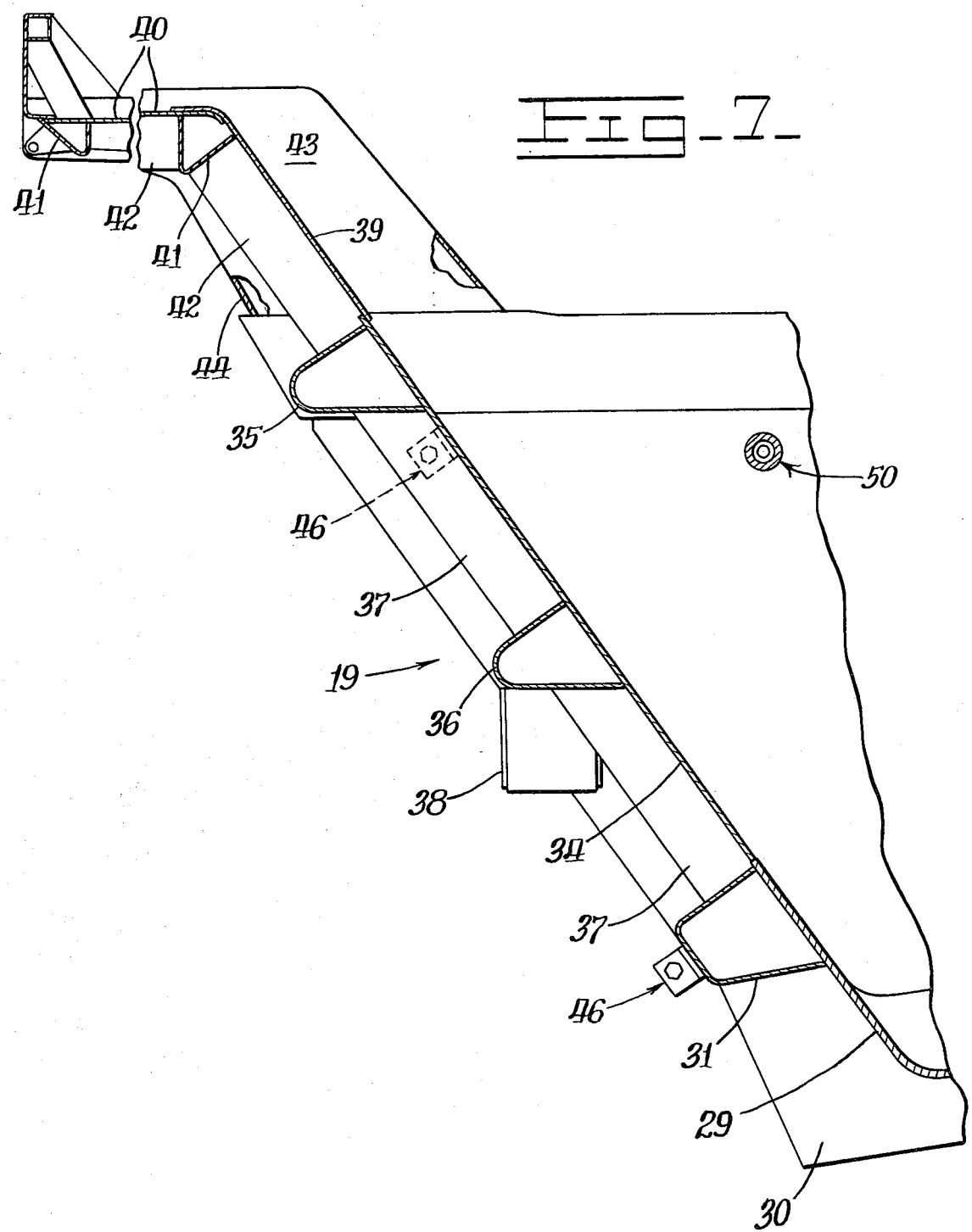

MODULAR TRUCK BODY AND METHOD FOR MAKING THE SAME

BACKGROUND OF THE INVENTION

The ever increasing size of on and off-highway trucks has given rise to shipping problems; namely, various regulations which dictate the maximum size of a truck and components thereof which may be shipped on commercial carriers. Therefore, truck bodies and the like are normally broken-down into their component parts to comply with such regulations and to also substantially decrease composite shipping volumes and shipping costs. In conventional practice, the truck body is normally completed at a manufacturing facility by securing the various plates and beam members thereof together by standard welding processes.

The completed truck body is then cut into several sections at the various welds for shipping purposes. The re-assembly and fabrication of the component parts at a customer's job site requires complex fixtures and methods for applying high quality welds over the welded joints which have been severed previously. In addition to the laborious and time-consuming nature of such a procedure, the resulting welds are sometimes found defective to thus impair the structural integrity of the completed truck body.

SUMMARY OF THIS INVENTION

An object of this invention is to overcome the above, briefly described problems by providing an economical and non-complex modular truck body which exhibits a high degree of structural integrity and a method of making the same expeditiously. The truck body comprises a pair of upstanding and laterally spaced modules of L-shaped cross section, a bottom module having its outer ends secured to inner ends of the side modules and an upstanding front module secured between the side modules and having its lower end secured to the bottom module. The modules are pre-assembled at a manufacturing facility and temporarily attached together. The modules are then disassembled and shipped to a job site whereat alignment means, employed during the pre-assembly operation, are utilized to precisely attach the modules together for final assembly purposes.

BRIEF DESCRIPTION OF THE DRAWINGS

Other objects of this invention will become apparent from the following description and accompanying drawings wherein:

FIG. 5 is an enlarged sectional view of a front portion of the truck body, taken in the direction of arrows V—V in FIG. 3;

FIG. 6 is an enlarged sectional view, taken in the direction of arrows VI—VI in FIG. 3; and FIG. 7 is an enlarged sectional view of a front portion of the completed truck body of FIG. 1.

DETAILED DESCRIPTION

Figure 1:
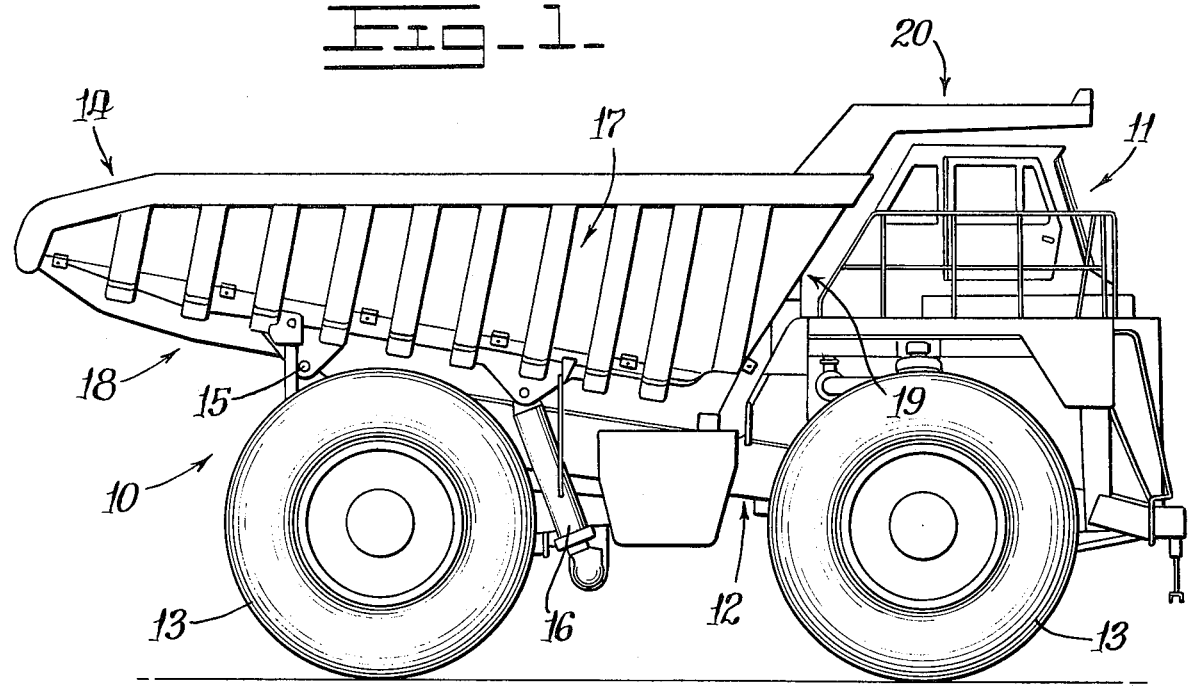
FIG. 1 is a side elevational view of an off-highway truck employing the modular truck body of this invention thereon.

FIG. 1 discloses an off-highway truck 10 comprising an operator's station or cab 11, a main frame 12 and a plurality of roadwheels 13 rotatably mounted on the frame in a conventional manner. A modular truck body 14 of this invention is pivotally mounted at its rearward end on the frame by a pair of laterally spaced pivot means 15 (one shown). A pair of double-acting hydraulic cylinders 16 (one shown) are pivotally interconnected between the frame and the truck body to selectively tilt the truck body rearwardly about pivot means 15 for dumping purposes.

Figure 2:
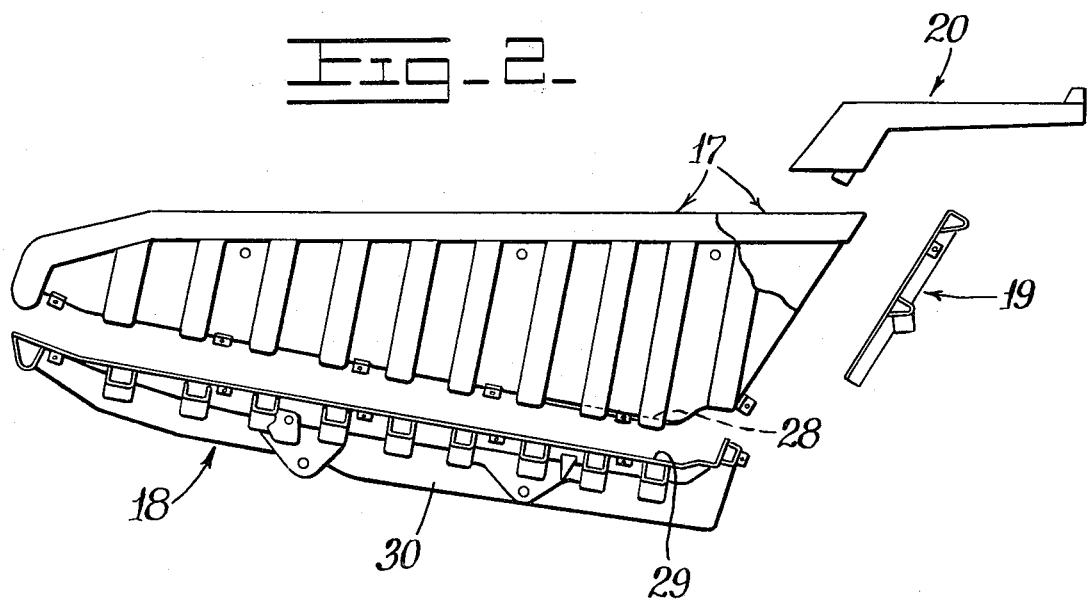
FIG. 2 is an exploded, side elevational view of the truck body.

Referring to FIG. 2, the truck body essentially comprises a pair of laterally spaced side modules 17, a generally horizontal floor module 18 and an upstanding front module 19. In addition, a canopy module 20 is preferably secured on a forward end of the truck body to overlie and protect operator's station 11 (FIG. 1). As will be hereinafter more fully described, the FIG. 2 truck body is adapted to undergo a pre-assembly operation at a manufacturing facility and subsequent disassembly and shipment to a customer's job site whereat the final assembly thereof is effected.

Figure 3:
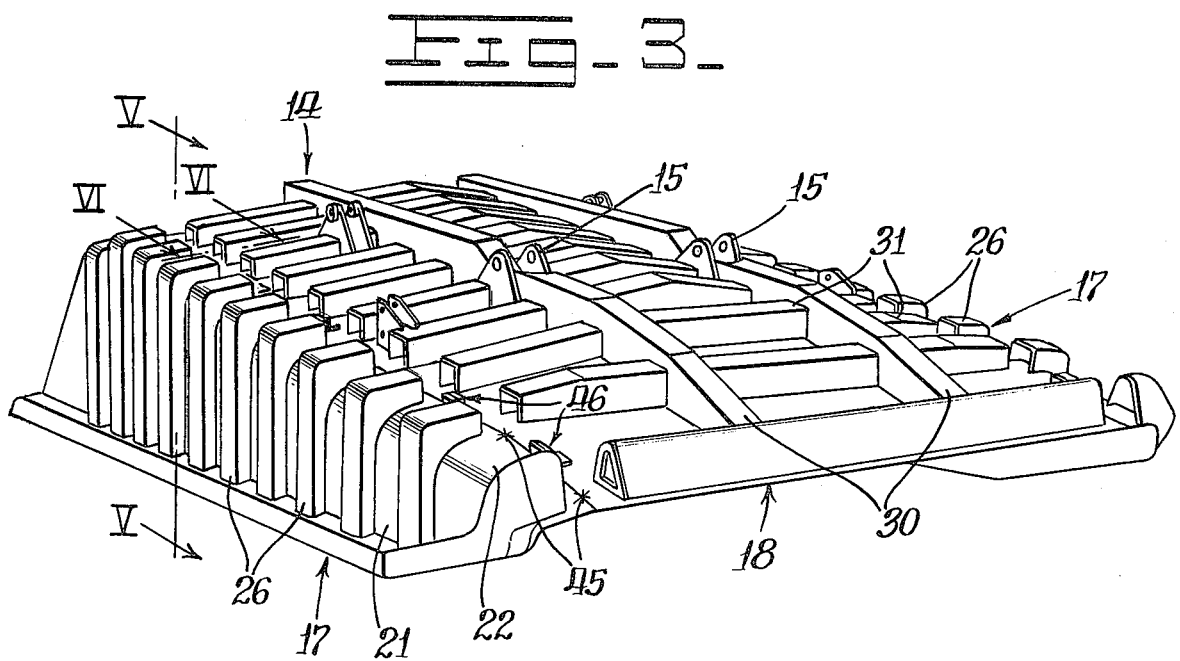
FIG. 3 is an isometric view of the truck body, showing it in an inverted position during pre-assembly thereof.

Referring to FIGS. 3–6, such pre-assembly is is preferably conducted when the truck body is inverted. The prefabricated modules are positioned as shown in FIG. 3 by suitably arranged jigs and fixtures. Each side module has an L-shaped cross section to comprise a generally vertical side plate or section 21 and a generally horizontal bottom plate or section 22 terminating at an inner end 23 thereof (FIG. 5).

Each side module terminates at its upper end at an elongated rail 24 secured at one side to an upper edge of plate 21 and at its other side to one leg of an L-shaped bracing plate 25. A plurality of longitudinally spaced L-shaped ribs 26, having a decreasingly shorter vertical height towards a rearward end of the truck body, are secured to side and bottom plates 21 and 22 and beneath bracing plate 25. The inner ends of the ribs have a U-shaped recess 27 formed thereon and outwardly from end 23 for purposes hereinafter explained.

As shown in FIGS. 2 and 6, a flange 28 is formed at the inner, forward end of plate 22 to overlap a plate 29 of floor module 18. The floor module further comprises a pair of parallel beams 30 and a plurality of longitudinally spaced and transversely disposed beams 31 of U-shaped cross section, all secured on plate 29. Beams 31 are interrupted by beams 30 and are each aligned with an end of a respective pair of ribs 26.

Referring to FIG. 5, the inner end of each beam 31 has a U-shaped recess 32 formed thereon. The recess substantially conforms to the shape of recess 27 and is longitudinally aligned therewith. In addition, recess 32 terminates short of an outer end 33 of bottom plate 29.

Figure 4:
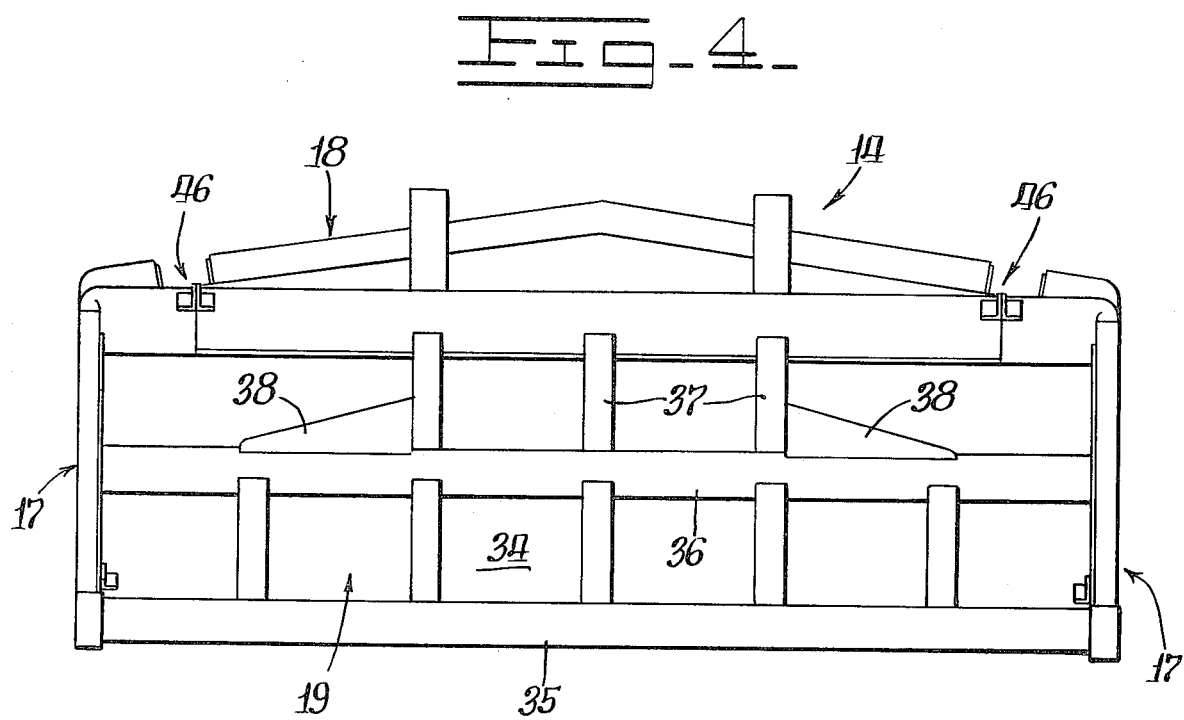
FIG. 4 is a front elevational view of the FIG. 3 truck body.

Referring to FIGS. 4 and 7, prefabricated front module 19 comprises an inclined plate 34 having an upper rail 35 secured thereon. A laterally extending intermediate rail 36 is also secured thereon along with a plurality of vertically disposed bracing beams 37 of U-shaped cross section. The front module further comprises a pair of laterally spaced and inclined box-like support structures 38 secured between plate 34, rail 36 and a respective beam 37.

Canopy module 20 (FIGS. 2 and 7) comprises a pair of overlapping main plates 39 and 40 having a plurality of transversely disposed beams 41 secured in underlying relationship thereon. A plurality of beams 42 are secured to beams 41 in transverse relationship therewith. A pair of laterally spaced L-shaped plates 43 are secured to the outer edges of a conforming outer wall 44 to provide a box-like sidewall at the forward, upper end of each side of the truck body.

PRE-ASSEMBLY OPERATION

FIG. 3 illustrates the truck body after it has undergone a pre-assembly operation, prior to disassembly and shipping thereof to a customer's job site. In particular, the side, bottom and front modules are pre-aligned at a manufacturing facility to facilitate expeditious final assembly thereof at such job site.

Suitable jigs and fixtures are employed to retain the modules in their FIG. 3 position wherein they may be tack welded together, as indicated by tack welds 45, for example. A plurality of combined alignment and releasable fastening means 46 are employed between adjacent pairs of modules to assure precise attachment of the modules together. Such means may comprise a pair of first and second L-shaped brackets 47 (FIG. 5) having their lower legs welded or otherwise suitably secured to plates 22 and 29, respectively, subsequent to the application of tack welds 45.

The upstanding legs of the brackets will thus abut each other in back-to-back relationship to align respective apertures 48 thereof. Each pair of aligned apertures are adapted to receive a fastener 49, such as a releasable nut and bolt. After the side, bottom and front modules have been attached together by fastening means 46, such fastening means, along with tack welds 45, are released and the truck body is disassembled into its modular units.

FINAL ASSEMBLY OPERATION

Upon such disassembly, the truck body is shipped to a customer's job site or the like, along with canopy module 20, four tie rod assemblies 50 and other miscellaneous hardware. At such job site, the modules are again positioned as shown in FIG. 3 and fastening means 46 are re-installed to fix the side, bottom and front modules in their precise positions. Simultaneously therewith, tie rod assemblies 50 are connected between side plates 21 of the side modules to further rigidify the assembled truck body during the subsequent welding operation.

Referring to FIG. 5, each end of each tie rod assembly has a threaded extension 51 secured thereon which extends through an opening 52, formed through a respective side plate, and receives a nut 53 thereon. An outer face 54 of the tie rod will abut an inner surface of the side plate to precisely set the predesigned distance between the inner surfaces of the side plates. Welds W, shown in dotted lines in FIGS. 5 and 6, are then applied between the seams defined between the outer ends of the bottom plate and the inner ends of the side plates.

As previously suggested in reference to FIGS. 2 and 6, the seam at a forward end of a truck body includes an overlapping of the adjacent ends of plates 22 and 29 at flange 28 to increase the structural integrity thereat. The ends of U-shaped connecting members 55 and 56 are each locked mechanically in like-shaped recesses 27 and 32 (FIGS. 5 and 6) and welded to straddled rib 26 and beam 31. Members 56 each have a pair of cutouts 57 (one shown in FIG. 6) formed on lower edges thereof to accommodate raised flange portion 28 of bottom plate 22.

The front module is then welded in place in a manner similar to that described above. The integrated side, bottom and front modules are then inverted and the canopy module is suitably welded in place. The completed truck body is then mounted and attached on frame 12 by pivot means 15 (FIG. 1) and cylinders 16 are pivotally interconnected therebetween.

Although fastening means 46 preferably remain secured to the truck body during installation thereof on frame 12 of the truck (FIG. 1), tie rod assemblies 50 are preferably removed therefrom. Such removal may be accomplished by first removing nuts 53 from the ends of each tie rod assembly and by then cutting the tie rod assembly in half. Openings 52 may be suitably plugged subsequent to such removal, as indicated by the non-appearance of such openings in FIG. 1.

We claim:

1. A modular truck body disposed on a longitudinal axis thereof comprising
   a pair of upstanding and laterally spaced side modules, each having an L-shaped cross section to comprise a generally vertical side section and a generally horizontal bottom section,
   a generally horizontal floor module having outer ends thereof secured to respective inner ends of said side modules,
   an upstanding front module having outer ends thereof secured between forward ends of said side modules and a lower edge thereof secured to said floor module,
   a plurality of longitudinally spaced L-shaped ribs having a U-shaped cross section secured exteriorly on each of said side modules, each rib terminating at an inner end short of the inner end of such side module,
   a plurality of transversely disposed and longitudinally spaced beams having a U-shaped cross section secured exteriorly on said bottom module, each beam extending between the inner ends of a pair of said ribs and terminating at outer ends thereof short of the outer ends of said bottom module, and
   a connecting member having a U-shaped cross section secured between each outer end of each of said beams and the inner end of a respective rib, wherein the inner end of each of said ribs and the outer end of each of said beams has a recess formed thereon along their entire edge for receiving an end of a respective connecting member therein, and wherein said side modules are further secured together by a plurality of combined alignment and releasable fastening means.

2. The modular truck body of claim 1 wherein a rearward end of said truck body is pivotally mounted on a frame of a vehicle and at least one hydraulic cylinder pivotally interconnected between said frame and said truck body for selectively tilting said truck body rearwardly about said pivot means.

3. The modular truck body of claim 2 wherein said vehicle further comprises an operator's station and further comprising a canopy module secured on a forward end of said truck body to overlie and protect said operator's station.

4. The modular truck body of claim 1 wherein said floor and front modules are secured together by welds at respective seams therebetween.

5. The modular truck body of claim 1 wherein each of said fastening means comprises a first bracket secured to said bottom module and a second bracket secured to a side module and positioned closely adjacent to said first bracket.

6. The modular truck body of claim 5 wherein each of said fastening means further comprises a pair of aligned apertures formed through said first and second brackets and a releasable fastener disposed in said apertures.

7. The modular truck body of claim 1 wherein a flange is formed on the end of each of said side modules, said flange overlapping said floor module.

* * * * *